Robson

[15] 3,635,837
[45] Jan. 18, 1972

[54] SPRAY-FORMED SODIUM NITRATE
[72] Inventor: Homer L. Robson, Hamden, Conn.
[73] Assignee: Olin Mathieson Chemical Corporation
[22] Filed: May 18, 1970
[21] Appl. No.: 48,751

Related U.S. Application Data
[62] Division of Ser. No. 656,688, July 28, 1967, Pat. No. 3,560,396.

[52] U.S. Cl. ...................252/397, 23/102 A, 71/59, 71/60, 71/64
[51] Int. Cl. ...................................................B01j 1/16
[58] Field of Search ..............252/397; 23/102 A; 71/59, 60, 71/64

[56] References Cited
UNITED STATES PATENTS
2,782,095  2/1957  Ames...................................23/102 A

*Primary Examiner*—Mayer Weinblatt
*Attorney*—Gordon D. Byrkit, Donald F. Clements, Walter D. Hunter, Ellen P. Trevors, Arthur N. Krein, Richard S. Strickler and George J. Koeser

[57] ABSTRACT

Sprayed-formed sodium nitrate preparations containing added diluents.

6 Claims, No Drawings

SPRAY-FORMED SODIUM NITRATE

This application is a division of U.S. Pat. application Ser. No. 656,688 now U.S. Pat. 3,560,396.

This invention relates to novel spray-formed sodium nitrate preparations and to calcium hypochlorite compositions containing them. In one aspect, the invention relates to solid compositions containing calcium hypochlorite diluted with spray-formed sodium nitrate. Other diluents known to be stable when mixed with solid calcium hypochlorite are also suitably present in the calcium hypochlorite compositions. These novel compositions are designed and have the advantage, over calcium hypochlorite compositions previously known to the art, of having a substantially slower rate of decomposition when accidentally contacted by organic or other readily oxidizable materials or by heat or fire.

Calcium hypochlorite is a well-known dry chemical and it has been made and sold commercially for many years. It is used as a source of "dry chlorine" for sanitation purposes for example, in disinfecting the water of swimming pools. The maintenance of a small residual of "available chlorine" suitably from about 0.5 to 1 part per million parts of water is sufficient to insure prompt destruction of bacterial contamination, so that the water is safe to swim in.

With widespread installation of swimming pools and resulting expansion of sales of calcium hypochlorite to the general public rather than primarily to other chemical manufacturers, municipal and other large-scale users, this vigorously reactive chemical has been placed in the hands of many who are unskilled in its use and unfamiliar with the hazards possibly resulting should it be involved in a fire. As a result, frequently of ignorance or carelessness, fires involving calcium hypochlorite have occurred endangering life and property. It is essential to provide a calcium hypochlorite product having a reduced rate of decomposition oven when misused or carelessly handled but which still retains high test and effectiveness sufficient for sanitation purposes.

In a number of instances, serious fires have have resulted when a solid hypochlorite has been contacted by a lighted cigarette. While dropping of a lighted cigarette into a commercial preparation of calcium hypochlorite is not a common occurrence, it does happen. Probably for each million hundred pound drums of calcium hypochlorite sold, one will have a lighted cigarette dropped in it; it is unlikely that the probability will be greater than one for each half million drums sold. The directions given with the product always warn against such a possibility and against other forms of contamination. To avoid this hazard, attempts have been made to safen calcium hypochlorite, especially against the hazard of contact with a lighted cigarette.

Various diluents have been proposed for use with solid hypochlorites for various purposes, including stabilization (e.g., $Na_2O$, in U.S. Pat. No. 1,961,576), detergent effects (e.g., U.S. Pat. No. 2,320,279–80), sequestering calcium (e.g., U.S. Pat. 2,166,362–3; 2,959,554) and for other purposes. However, because of the extreme chemical reactivity of the hypochlorites, especially solid, high test 70+ percent available chlorine) calcium hypochlorite, the choice of diluents is severely limited. Many proposed diluents actually deleteriously affect the stability of hypochlorites and cause them to lose available chlorine rapidly. Especially at elevated temperatures, many proposed diluents actually cause rapid decomposition in contact with hypochlorites.

Sodium nitrate in crystalline form is suggested as a diluent in solid calcium hypochlorite compositions, for example, in U.S. Pat. No. 2,963,440, in U.S. Pat. No. 3,234,151 along with sodium sulfate and in U.S. Pat. No. 3,276,949 along with sodium sulfate in a particular form of tablet. In all cases in the prior art, however, the sodium nitrate is used in the granular or crystalline form in which it appears in commerce, which may be ground and sized to particular screen specifications.

In the early commercialization of calcium hypochlorite, calcium hydroxide was a favorite diluent. Many of the processes employed for the preparation of calcium hypochlorite tended to leave calcium hydroxide in the product. The second most popular diluent was sodium chloride and was a naturally formed diluent in the processes adopted by the Mathieson Alkali Works, Inc., who introduced "HTH" brand of calcium hypochlorite in 1928.

The first products put out were advertised to contain 65 percent calcium hypochlorite and this seem ed a suitable concentration. However, buyers have a natural reluctance to pay for diluents, and after a few years, around 1934, the product was generally brought to a 70 percent test. Foreign manufactures, as they entered the market in the 1930's, generally had trouble with purifying the product and much of their output was below 70 percent. Purchasers continued to press for higher tests and by 1935 the Mathieson Alkali Works was shipping carload lots of calcium hypochlorite testing 80 percent of higher in calcium hypochlorite content.

When several drums of "HTH" containing over 80 percent calcium hypochlorite became involved in fires, it was observed that the decomposition of the calcium hypochlorite of 80 percent test was more vigorous than that of 79 percent test. As a result, extensive tests were undertaken and shipment of 80 percent and higher material was discontinued. Because of the dominance of the Mathieson Alkali Works in the manufacture and sale of calcium hypochlorite, the ban on shipments of 80 percent or over material has remained effective for 30 years.

The tests run during the 1930's were mostly run in 100 lb. drums of commercial product. It was found that when sodium chloride was present only in a few percent, and calcium hydroxide was the main diluent, a product initially at room temperature (75° F.) would show a maximum temperature during decomposition of 950° F., and that the release of oxygen was quite rapid, throwing much of the material out of the drum. When calcium hydroxide was present in only a few percent and sodium chloride was present to e.g., 20° the maximum temperature observed was about 900° F. and the release of oxygen was much slower, so that most of the residue remained in the drum. Further, the decomposed residue could be reheated obtaining partial melting at 900° F. On repeated melting and cooling, the softening temperature sometimes rose to 910° F., indicating the some impurities were slowly expelled from the molten material. The eutectic temperature for $NaCl$ and $CaCl_2$ is generally given at 960° F., but this is lowered to 900° F. by impurities, such as calcium hydroxide, calcium carbonate, magnesia, silicates, etc. In contrast, the residue when the diluent was calcium hydroxide showed no such softening on reheating, as the melting point of anhydrous calcium chloride is 1,420° F. and the impurities do not appreciably lower this.

Accordingly, "HTH" was generally made to contain 72–73,5 percent calcium hypochlorite and to have 18–21 percent sodium chloride, a composition that has continued in use to today.

Further work to safen calcium hypochlorite compositions was undertaken in which most of the sodium chloride formed in the manufacturing process was removed prior to drying the calcium hypochlorite product and was replaced by sodium nitrate. Sodium nitrate was employed because its melting point, 585° F., lay below the temperature at which calcium chlorate rapidly evolves oxygen. Several pilot lots containing crystallized sodium nitrate were prepared. Replacing the sodium chloride with sodium nitrate involved additional costs which the customer declined to pay. Further, the drying operation was more difficult with the nitrate present, because of the high solubility of sodium nitrate at drying temperatures.

Later, higher test calcium hypochlorite preparations (80–85 percent available chlorine) were made by known methods and these were diluted to 72–74 percent calcium hypochlorite content by addition of crystalline sodium nitrate. However, such admixtures were not as effected in reducing sensitivity to a lighted cigarette as were the preparations in which the sodium nitrate was added before drying. During drying, the sodium nitrate formed fine crystals, intimately mixed with the calcium hypochlorite, while in the admixture the contact was less intimate. Further, careful study showed that grains of sodium nitrate coarser than 30 mesh took a measureable time to melt, and so did not effectively dampen the decomposition of the calcium hypochlorite.

Accordingly, it is one object of the present invention to provide compositions having materially lowered rates of propagation of decomposition while maintaining high available chlorine content compared with any compositions of the prior art.

Another object of the present invention is to provide spray-formed sodium nitrate preparations containing suitable diluents, said preparations being especially advantageous for mixing with calcium hypochlorite to lower the rate of propagation of decomposition of the hypochlorite.

Other objects of this invention appear elsewhere in this specification.

In one aspect, the present invention provides spray-formed sodium nitrate preparations comprising from 3 to 20 percent by weight of a diluent other than sodium nitrate selected from the class consisting of alkali metal nitrates, alkaline earth metal nitrates, alkali metal sulfates, alkali metal silicates, silicic acid and mixtures thereof.

In another aspect, the present invention provides calcium hypochlorite compositions comprising 50 to 90 percent of particles of a calcium hypochlorite preparation containing 70 to 85 percent of $Ca(OCl)_2$, 5 to 25 percent of NaCl and minor amounts of constituents normally present in calcium hypochlorite preparations; and 10 to 50 percent of a sodium nitrate preparation in the form of spray-formed particles, said particles of sodium nitrate preparation containing from 0 to 25 percent of diluent other than sodium nitrate selected from the class consisting of alkali metal nitrates, alkaline earth metal nitrates, alkali metal sulfates, alkali metal silicates, silicic acid and mixtures thereof; said particles of said sodium nitrate preparation and of said calcium hypochlorite preparation having a screen size of less than 10 percent through 100 mesh and less than 5 on 10 mesh U.S. Standard screens.

For the purposes of the present invention, commercial calcium hypochlorite preparations are generally suitable but specially high test compositions are sometimes desirably used. Commercial calcium hypochlorite as generally solid contains 70 available chlorine and usually contains 71 to 73 percent as manufactured. The general range of the usual impurities is as given in table I, column 1. A typical composition of "HTH," a leading commercial product, is given in column 2. However, it is possible to prepare calcium hypochlorite preparations of greater purity, and if the product is to be blended with a specific diluent, such as sodium nitrate, to produce a lower test product of improved safety, the higher test product, such as given in column 3, is advantageously used as a starting material.

TABLE I

| Component | Column 1 Commercial range | Column 2 Typical "HTH" | Column 3 Special high test "HTH" |
|---|---|---|---|
| Calcium hypochlorite | 70.0–74.5 | 71.7 | 81.0 |
| Calcium chloride | 0.5–3.0 | 1.4 | 1.1 |
| Calcium chlorate | 0.4–4.0 | 0.9 | 0.7 |
| Calcium hydroxide | 1.5–5.0 | 2.1 | 2.0 |
| Calcium carbonate | 1.0–5.0 | 1.3 | 1.2 |
| $R_2O_3$,etc., | 0.3–1.0 | 0.5 | 0.4 |
| Sodium chloride | 4.0–23.0 | 21.3 | 13.0 |
| Water | 0.4–2.5 | 0.8 | 0.6 |
| Total | 100.0 | 100.0 | 100.0 |

The prepared calcium hypochloride is the commercially available granular product having a screen analysis (U.S. Standard Screens) of 70 to 85 percent through 10 and on 30 mesh, not over 3 percent through 100 mesh.

By the term "calcium hypochlorite" in the present specification and claims is meant "true" calcium hypochlorite, a compound of the formula, $Ca(OCl)_2$. Various preparations contain varying amounts of $Ca(OCl)_2$ as indicated in table I and elsewhere herein.

Spray-dried or spray-formed sodium nitrate particles have a single principal void, surrounded by a relatively thin wall made up of very small crystallites of sodium nitrate. The thin wall provides a large amount of surface and is quick melting. This is particularly advantageous when the sodium nitrate particles are mixed with calcium hypochlorite particles. The sodium nitrate particles absorb the heat of hot decomposition gases and cools them. The rate of propagation of the decomposition of the hypochlorite is thus materially slowed.

Spray-formed sodium nitrate consists of mixed screen sizes of particles and is suitable for use according to the present invention. Preferably, however, the sodium nitrate particles have screen sizes corresponding more closely to the screen sizes of the calcium hypochlorite particles used. This is desirable in order to avoid segregation during shipment. Most advantageous results are obtained when the spray-formed sodium nitrate is sized to be slightly smaller on the average than the average size of the calcium hypochlorite particles. The sodium nitrate particles fill the voids between the calcium hypochlorite particles, and are favorably disposed to impede the flow of hot decomposition gases and to cool them by melting the sodium nitrate.

Close sizing is also desirable in order that, when the material is thrown into water, each grain separates and settles separately with no formation of lumps. In a product containing a wide range of screen sizes, the small particles fill the voids between the larger particles and on contact with water penetration is slow and lumping occurs. Thus, an open structure such as is given by close sizing is desirable. When this feature is tested against the rate at which a decomposition will propagate through a mass of commercial calcium hypochlorite, it is found that an open structure in general allows faster propagation, while a wide range of screen sizes, which loads to caking when thrown into water, gives slower propagation. However, if the finer particles are made of a thin walled, very fast dissolving material, such as spray-formed sodium nitrate, they impede the flow of hot gases and reduced the rate of propagation of decomposition. At the same time, the finer, spray-formed particles avoid caking when the material is thrown into water, because the thin walled material dissolves rapidly and allows the calcium hypochlorite grains to stay separates until they, too, have dissolved. Calcium hypochlorite has a strong tendency to form the dihydrate when it contacts water and this hydrate formation leads to caking of material which is not dispersed.

The strength of walls of the spray-formed particles of sodium nitrate is ample to resist attrition satisfactorily in particles smaller than 40 mesh. In the coarser sizes, spray-formed sodium nitrate has a shell composed on many small rhombohedrons thinly bridged together and the walls are weaker. The shell structure of spray-formed sodium nitrate is considerably strengthened by small additions of other salts. For example, addition of 5 percent dry weight of sodium sulfate or sodium silicate to sodium nitrate before spray forming gives a much stronger shell, which stands up better under the vibration and wear of shipment. Such additions are advantageous in spray-forming sodium nitrate in any particle size but are particularly desirable were spray-formed sodium nitrate coarser than 30 mesh is required. Sodium sulfate is especially advantageous since, admixed with sodium nitrate, it forms long, lathlike crystals that crisscross and interlock to form a strong shell. Other salts which are suitably added to sodium nitrate before spray forming include lithium nitrate, potassium nitrate, and the other alkali metal nitrates, calcium nitrate and the other alkaline earth metal nitrates of magnesium, barium, strontium and alkali metal sulfates and silicates and silicic acid. These diluents and mixtures thereof are suitable for use in the present invention for improving the strength of the walls of the spray-formed sodium nitrate and for other purposes.

When these strength improvers are included in the spray-formed sodium nitrate particles, suitably they amount to up to about 20 percent based on the sodium nitrate. The addition of a 5 percent of sodium sulfate appreciably increases the wall strength of spray-formed sodium nitrate, especially the smaller particles, to resist the crushing and agitation involved in shipment. Particles larger than 30 mesh are not as strong and to some extent tend to break down during shipment and handling. Increasing the content of sodium sulfate, on a dry basis, to 15 to 20 percent of the total sodium nitrate and sodium sulfate, produces more satisfactory spray-formed beads. Not all of the larger particles, such as plus 40 and plus 30 mesh, are in the form of perfect spheres, but are adequate to give the desired essential character to the diluted mix. Further, the improved resistance to crushing permits commercial handling and shipment over substantial distances of calcium hypochlorite preparations prepared therefrom.

Sodium silicate added to sodium nitrate solution before spray drying advantageously lowers the melting point of the sodium nitrate which, in turn, lowers the rate of propagation of decomposition of calcium hypochlorite admixed therewith. In using sodium silicate, it is particularly advantageous to adjust the pH of the solution after mixing the silicate and nitrate to a pH of about 9 to 10 with vigorous stirring. The resulting silicic acid forms viscous slurries which spray form to produce strong beads of sodium nitrate materially strengthened by 2 to 5 of silicic acid. The dried beads very effectively quench decomposition propagation in calcium hypochlorite compositions containing them.

Potassium nitrate is useful as a modifier of the shell structure of sodium nitrate. Potassium nitrate, by itself, is not as effective as sodium nitrate in lowering the propagation rate of decomposition in these calcium hypochlorite compositions. The melting point of potassium nitrate is 334° C. (631° F.) which is somewhat higher than that of sodium nitrate at 306.8° C. (584° F.) However, the melting points of many mixtures of sodium and potassium nitrates are lower than those of either alone and are suitable for use in this invention, particularly when 3 to 10 percent by weight of potassium nitrate based on the sodium nitrate is used.

Lithium nitrate by itself is very effective in reducing the propagation rate of decomposition in calcium hypochlorite compositions. However, its high price and strong hygroscopicity make it less suitable as a commercial diluent. The addition of 5 to 10 percent of lithium nitrate to sodium nitrate prior to spray forming significantly improves the effectiveness of the diluent in slowing propagation of decomposition. Such proportions of lithium nitrate do not increase the hygroscopicity beyond acceptable limits. Mixtures of both potassium nitrate and lithium nitrate are suitably used with a major portion, for example, 80 percent of sodium nitrate. The amount of lithium nitrate should exceed that of the potassium nitrate in such mixtures for best results.

Calcium nitrate by itself is less effective in retarding the decomposition than sodium nitrate and is also quite hygroscopic and less suitable as a diluent, but minor amounts are suitably employed where the diluent is mainly sodium nitrate.

EXAMPLE I

Mixtures of calcium hypochlorite and spray-formed sodium nitrate were prepared using commercial "HTH" brand of calcium hypochlorite having 70.4 percent available chlorine. The minimum (loose-packed) density was 0.79 and the maximum (shaken) density was 0.83. The screen analysis (U.S. Standard screens) was as follows:

| Screen | Weight percent |
|---|---|
| On 14 mesh | 0 |
| On 16 mesh | 8 |
| On 20 mesh | 35 |
| On 30 mesh | 33 |
| On 40 mesh | 16 |
| On 50 mesh | 5 |
| On 70 mesh | 1.3 |
| Through 70 mesh | 1.7 |
| Total | 100.0 |

Spray-formed sodium nitrate was screened and separated into fractions which were each separately blended with unscreened "HTH" described above. For comparison, commercial granular sodium nitrate was also screened into fractions and similarly blended with "HTH." In each blend, sufficient sodium nitrate was used to form a mixed product having an available chlorine content of 55 percent.

Mixtures of the same "HTH" were also made with butterflake salt and with ordinary table salt. The butterflake salt nearly all passed through 30 mesh, retained on 70 mesh with less than 5 percent falling above and below these limits. It is a flake product of a high-surface area and low density, usually having a minimum apparent density between 0.65 and 0.75. The table salt used contained no added ingredients, such as tricalcium silicate, or other material to improve flowability in moist weather. It was cubic in form, and had a minimum apparent density of 1.22, and was 90 percent between the limits of thru 40 and on 70 mesh.

Decomposition rate of each composition was measured as the number of seconds for decomposition to travel 4 inches in a trough filled with 140 grams of the sample when ignited by a burning sulfur flare inserted at one end of the trough. The trough was formed of 10 mil brass shim stock and was 4½inches long and 2 inches wide at the top. Sides were 1¼inches high and the bottom consisted of three flat areas about 0.8 inch wide by 4½inches long at 45° to each other. The inside of the trough was lined with asbestos paper, replaced after each test. The ends were closed with 1/16-inch thick asbestos board. Decomposition rates appear in table II.

The data of table II show the superiority of the spray-formed sodium nitrate over granular sodium nitrate especially in the finer sizes.

TABLE II

| No. | Diluent | Time, Seconds | |
|---|---|---|---|
| 1. | None: "HTH" (70% av. $Cl_2$; 1% $H_2O$ | 20–25 | |
| 2. | Butterflake salt | 53 | |
| 3. | Table salt | 38 | |
| 4. | Sodium nitrate | Spray-formed | Granular |
| | On 16 mesh | 60 | 55 |
| | Through 16, on 20 mesh | 55 | 56 |
| | Through 20, on 30 mesh | 100 | 65 |
| | Through 30, on 40 mesh | 200 | 62 |
| | Through 40, on 50 mesh | 210 | 53 |
| | 50, on 70 mesh | 220 | 50 |

Still finer material gave slower propagation rates, but is undesirable in commercial material, which should have little material finer than 100 mesh in it.

Example II

Twenty-eight parts by weight of "C" brand (Philadelphia Quartz) sodium silicate solution having a ratio of $SiO_2$:$Na_2O$ of 2:1 were added to 470 parts by weight of water and the mixture was stirred until all the silicate was dispersed. The pH was 11. Then 320 parts by weight of solid sodium nitrate was added to form a solution containing 40 percent of $NaNO_3$. Separately, concentrated $H_2SO_4$ was added with stirring to a 40 percent aqueous solution of sodium nitrate until the mixture contained 10 percent by weight of $H_2SO_4$. Sufficient of this acid solution was added with vigorous stirring to the silicate-nitrate solution to bring the pH to about 9.5. Stirring was continued for 30 minutes. The resulting mixture was spray formed through pressure-type nozzles into a stream of hot drying air in conventional spray during equipment to form beads having a minimum apparent density of 0.50 and a maximum apparent density of 0.63. The resulting beads contained about 2.5 percent of silicic acid and 2.8 percent of sodium sulfate.

This product was effective as a quenching agent for decomposition propagation when blended in calcium hypochlorite compositions and tested as described in example VI, table III, Item 6.

Example III

A solution of sodium nitrate and sodium sulfate in a weight ratio of 83:17, with 42 total solids, balance water, was prepared by dissolving 820 parts by weight of sodium sulfate in 6,700 parts of water and dissolving 4,000 parts of sodium nitrate therein. This solution was pumped through a nozzle into a spray drier. The resulting sodium nitrate preparation showed generally spherical form with small knobs attached to the spheres. In an abrasion test, many of these knobs were removed but in a shipping test wherein a drum of the product was shipped 2,000 miles by rail, the volume settled only about 6 to 7 percent.

This product was effective as a quenching agent for decomposition propagation when blended in calcium hypochlorite compositions and tested as described in example VI, table III, item 7.

Example IV

A "special" calcium hypochlorite preparation containing 81.0 percent available chlorine and having the analysis shown in table I, column 3 was blended with the spray-formed sodium nitrate-sodium sulfate preparation obtained as described in example III, in proportion to produce a product containing 55 percent available chlorine. Decomposition rate by the test described in example I was 105 seconds.

Example V

Solutions containing sodium nitrate and sodium silicate in weight ratios of 95:5 and 80:20 with about 40 percent total solids were prepared by dissolving suitable proportions of sodium nitrate and "C" brand sodium silicate in water. These solutions were sprayed in conventional equipment to produce spray-formed sodium nitrate preparations. The products, containing 5 percent and 20 percent respectively of sodium silicate were suitable for use according to the present invention. They were blended with calcium hypochlorite and tested as described in example VI, table III, Items 8 and 9.

Example VI

A commercial form of "HTH" known as "Lobax Grade" was taken for tests. This material contained 70.9 percent available chlorine and had at least 93 percent through 30 mesh and on 70 mesh. While 5 to 7 percent passed the 70-mesh screen, only 1 to 3 percent passed a 100-mesh screen. The sample taken had a minimum apparent density of 0.76 and a maximum apparent density of 0.84. Tested in the apparatus and by the procedure described in example I, the decomposition required 32 seconds to travel 4 inches.

Sufficient of the diluents listed in table III were blended with this "Lobax Grade" calcium hypochlorite to produce material of 55 percent available chlorine. All the diluents were screened to be thru 40 mesh and retained on 70 mesh. The times for the decomposition to propagate through 4 inches appear in table III.

In the compositions shown in table III, the silicic acid and sodium sulfate added to the sodium nitrate result in spray-formed particles having stronger walls and the improved form contributes to the slower rates of propagation. Sodium silicate does not improve the structure of the spray-formed particles of sodium nitrate but directly contributes to the slower rate of propagation because it lowers the melting point of the sodium nitrate.

Table III

| No. | Diluent | Time, Seconds |
|---|---|---|
| 1 | None (70.9% av. Cl.) | 32 |
| 2 | Cubic salt | 40 |
| 3 | Butterflake salt | 48 |
| 4 | Granular sodium nitrate | 52 |
| 5 | Spray-formed NaNO$_3$ (pure) | 71 |
| 6 | Spray-formed NaNO$_3$ strengthened with content of 2.5% silicic acid and 2.8% sodium sulfate (Product of example II) | 80 |
| 7 | Spray-formed NaNO$_3$ strengthened with content of 17% Na$_2$SO$_4$ (Product of example III) | 90 |
| 8 | Spray-formed NaNO$_3$ strengthened with content of 5% sodium silicate (Product of example V) | 90 |
| 9 | Spray-formed NaNO$_3$ strengthened with content of 20% sodium silicate (Product of example V) | 90 |

What is claimed is:

1. A spray-formed sodium nitrate preparation having a single principal void surrounded by a relatively thin wall of crystallites consisting essentially of from 3 to 20 percent by weight of a diluent other than sodium nitrate selected from the class consisting of alkali metal nitrates, alkaline earth metal nitrates, alkali metal sulfates, alkali metal silicates, silicic acid and mixtures thereof.

2. A preparation as claimed in claim 1 in which said diluent is sodium sulfate.

3. A preparation as claimed in claim 2 in which said sodium sulfate amounts to 15 to 25 percent by weight of said preparation.

4. A preparation as claimed in claim 1 in which said diluent is lithium nitrate.

5. A preparation as claimed in claim 1 which said diluent is a mixture of sodium sulfate and silicic acid.

6. A preparation as claimed in claim 5 in which said sodium sulfate amounts to 2 to 20 percent by weight and said silicic acid amounts to 2 to 5 percent by weight of the preparation.

* * * * *